April 17, 1962  T. GAGGINI  3,029,507
ONE PIECE THIN WALLED METAL CONTAINER AND
METHOD OF MANUFACTURING SAME
Filed Nov. 20, 1957  7 Sheets-Sheet 1

INVENTOR.
TORELLO GAGGINI
BY Bertha L. McGregor
ATTORNEY

INVENTOR.
TORELLO GAGGINI

April 17, 1962 T. GAGGINI 3,029,507
ONE PIECE THIN WALLED METAL CONTAINER AND
METHOD OF MANUFACTURING SAME
Filed Nov. 20, 1957 7 Sheets-Sheet 3

INVENTOR.
TORELLO GAGGINI
BY Bertha L. McGregor
ATTORNEY

April 17, 1962　　　T. GAGGINI　　　3,029,507
ONE PIECE THIN WALLED METAL CONTAINER AND
METHOD OF MANUFACTURING SAME
Filed Nov. 20, 1957　　　　　　　　　　7 Sheets-Sheet 4

INVENTOR.
TORELLO GAGGINI
BY Bertha L. MacGregor
ATTORNEY

INVENTOR.
TORELLO GAGGINI

BY Bertha L. MacGregor
ATTORNEY

April 17, 1962     T. GAGGINI     3,029,507
ONE PIECE THIN WALLED METAL CONTAINER AND
METHOD OF MANUFACTURING SAME
Filed Nov. 20, 1957     7 Sheets-Sheet 6

INVENTOR.
TORELLO GAGGINI
BY *Bertha L. McGregor*
ATTORNEY

April 17, 1962 T. GAGGINI 3,029,507
ONE PIECE THIN WALLED METAL CONTAINER AND
METHOD OF MANUFACTURING SAME
Filed Nov. 20, 1957 7 Sheets-Sheet 7

INVENTOR.
TORELLO GAGGINI
BY Bertha L. McGregor
ATTORNEY

United States Patent Office 3,029,507
Patented Apr. 17, 1962

3,029,507
ONE PIECE THIN WALLED METAL CONTAINER AND METHOD OF MANUFACTURING SAME
Torello Gaggini, Milan, Italy, assignor, by mesne assignments, to Coors Porcelain Company, Golden, Colo., a corporation of Colorado
Filed Nov. 20, 1957, Ser. No. 697,605
5 Claims. (Cl. 29—534)

This invention relates to one piece, thin walled metal containers, preferably made of aluminum or aluminum alloys, and to the method of manufacturing them. The containers herein shown and described are hollow cylindrical containers having very thin integrally formed walls, reduced diameter neck portions, and externally concave bottoms which vary radially in thickness to provide uniform resistance against distortion. The thin walled containers produced by the described method are capable of holding materials under pressure as well as other fluid and solid materials.

The main object of this invention is to produce, by a commercially economical method, seamless very thin walled containers capable of resisting pressures for their intended purposes, from slugs which contain a volume of metal only slightly greater than that utilized in the finished containers. Magnesium and magnesium alloys may be substituted for the preferred aluminum and aluminum alloys. Copper and copper alloys also may be employed in making containers embodying my invention but at present are not economically practical.

For example, a 12 ounce aluminum container, 6.181 inches in height and having a diameter of 2.275 inches, made according to this invention, weighs less than half as much as a conventional metallic can of the same capacity. This is due to the distribution of metal in the respective neck, side and bottom portions, and to the seamless construction of the container. Portions of the side walls in the container of this example are only .013 inch in thickness while other portions extending upwardly and downwardly from said thinnest areas gradually increase in thickness to approximately double said minimum thickness.

The novel method of construction herein described and claimed produces the integral bottom and cylindrical body in a single impact extrusion operation, followed by drawing the body to desired length and concaving the bottom, and then necking the upper portion in a series of steps which gradually reduce the diameter of the open end of the body while simultaneously thickening the neck walls without wrinkling or marrying the smooth contour of the thin walled container.

Other objects and advantages of the invention will be apparent from the drawings and following specification. The steps of the method of manufacturing seamless thin walled aluminum containers suitable for holding material under pressure and for other purposes, will be described in connection with the apparatus employed in carrying out the method.

Figure 10:
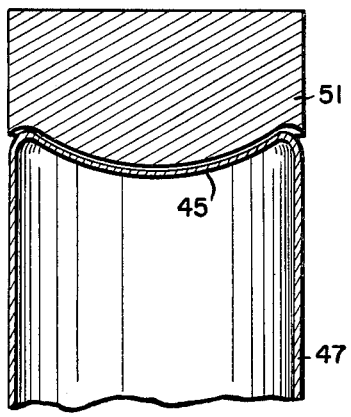
FIG. 10 illustrates the first of a series of successive necking steps to which the container of FIG. 9 is subjected, said figure showing the container inverted, with an upper die pressing on the container bottom in an axial direction, the open neck of the container bearing against the internally shaped necking die while a mandrel extends upwardly into the container neck.
Figure 10:
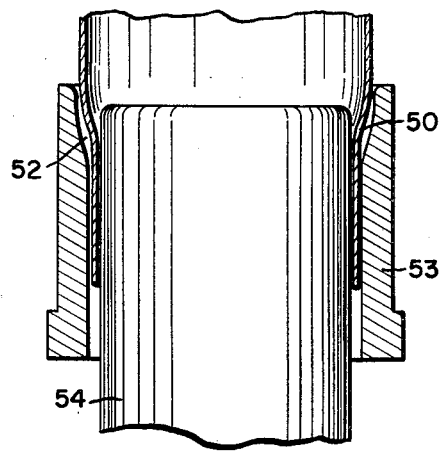
Figure 14:
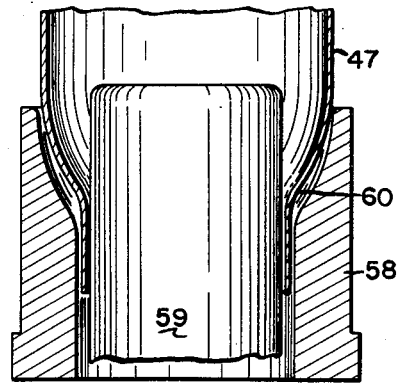
FIG. 14 is an elevational view of the neck portion of the inverted container as it appears when about to be subjected to the fifth necking operation, showing a modified lower necking die and reduced diameter mandrel, but not showing the upper die for bearing on the bottom of the inverted container which is the same as that shown in FIG. 10.

FIGS. 15 to 21, inclusive, are elevational views of the neck portion of the inverted container, as it appears after having been subjected to the sixth through the twelfth necking operations in apparatus employing the upper bearing die of FIG. 10 and modified lower necking dies of the type shown in FIGS. 10 and 14, but progressively smaller in internal diameter for each operation. In these steps, the use of the inserted mandrel may be dispensed with as will be explained hereinafter.

Figure 22:
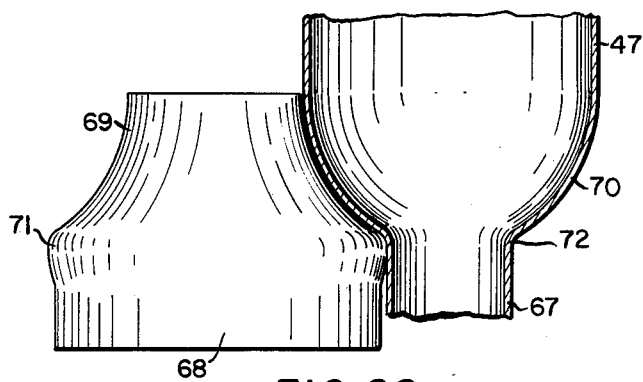

FIG. 22 is an elevational view of the necked container, inverted, and a neck finishing roll in contact therewith.

Figure 23:
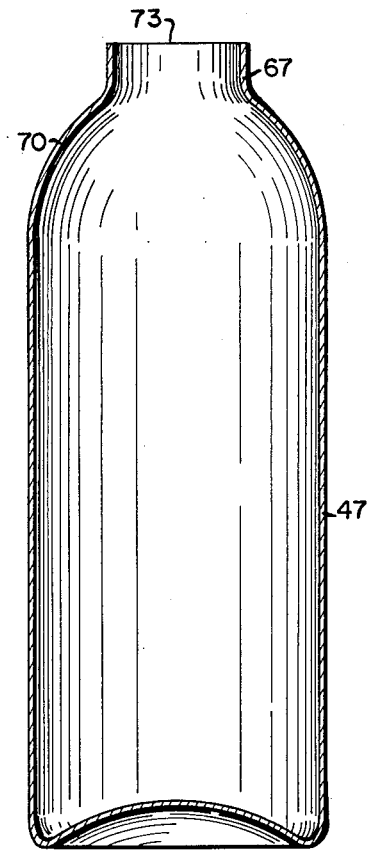

FIG. 23 is a vertical sectional view of the necked container after the neck has been trimmed to desired length.

Figure 24:
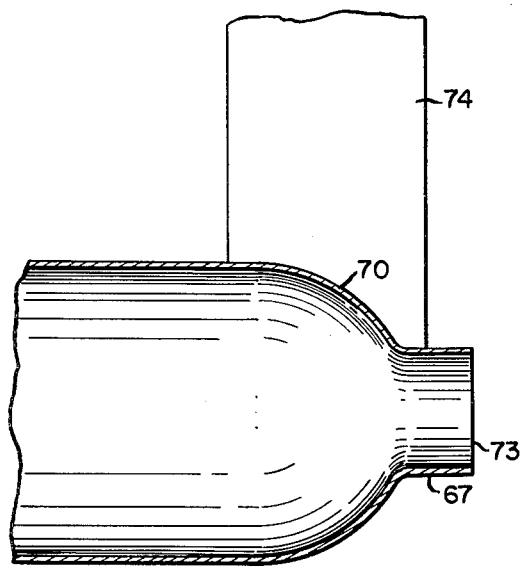

FIG. 24 shows the container of FIG. 23 being subjected to the action of a polishing tool.

Figures 25, 26, 27:
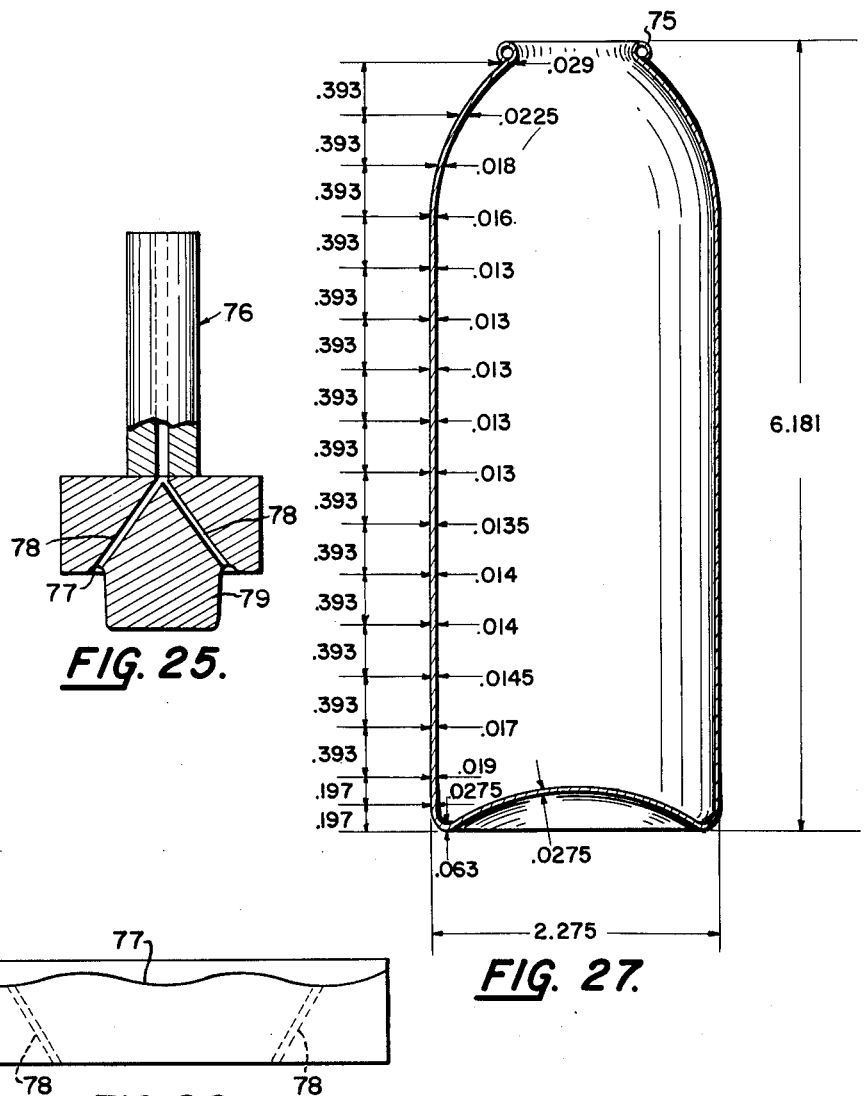

FIGS. 25 and 26 show a neck curling tool and mandrel used for curling the trimmed neck of the container.

FIG. 27 is a vertical sectional view of the finished container produced by the method described herein.

Figure 5:
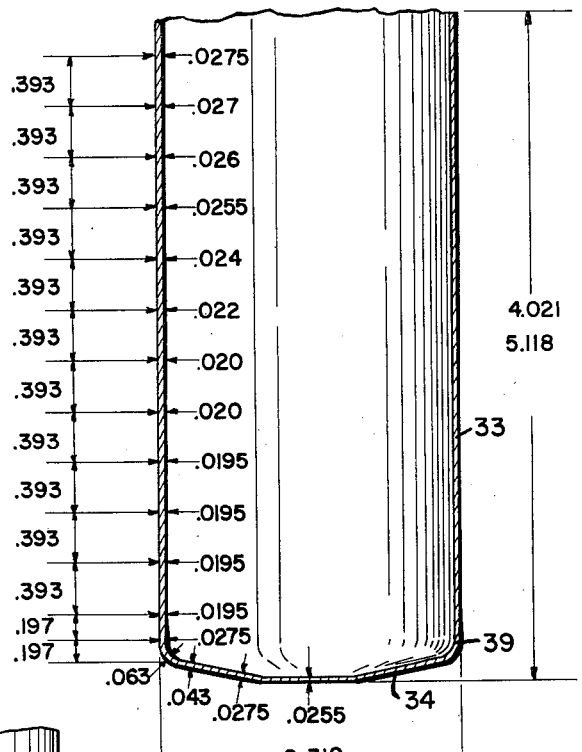
FIG. 5 is a vertical sectional view of the container as it appears at the end of the extrusion step.
Figure 9:
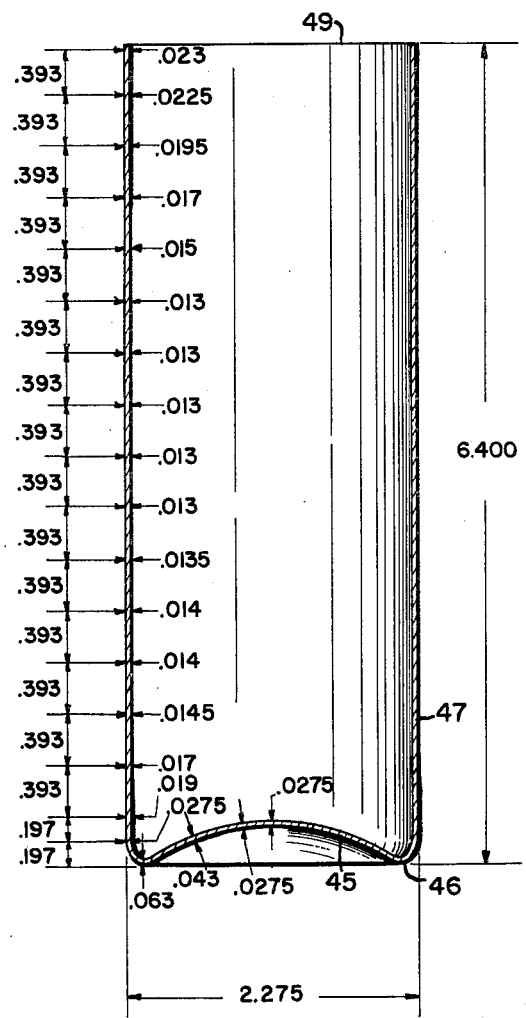
FIG. 9 shows the same container after it has been trimmed to desired length.

The container shown herein is a 12 fluid ounce container and the wall thicknesses and dimensions stated in FIGS. 5, 9 and 27 are those preferred for a container of the capacity stated. Obviously the wall thicknesses and dimensions may be varied proportionately for containers of different sizes.

Figure 1:
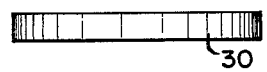
FIG. 1 is a side elevation of an aluminum slug from which the seamless container is produced.
Figure 2:
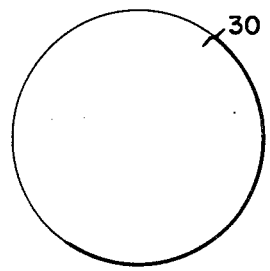
FIG. 2 is a plan view of the slug.
Figure 3:
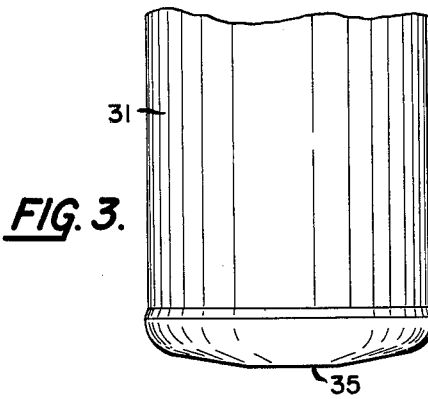
FIG. 3 is an elevational view of a reciprocating punch which cooperates with the die shown partly in section in FIG. 4 for performing the impact extrusion or first step of the method.
Figure 4:
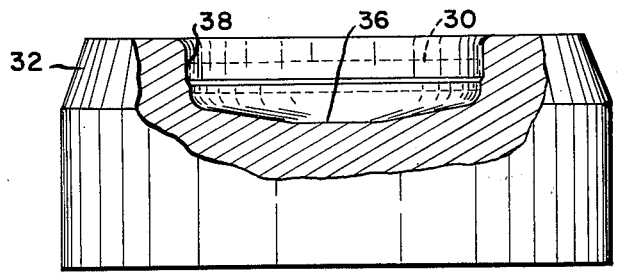

The first step of the method of this invention consists in subjecting an annealed and lubricated aluminum slug, indicated at 30 in FIGS. 1, 2 and 3, to an impact extrusion operation. The punch 31, FIG. 2, is fastened to the ram of a press (not shown). The punch 31 is moved toward and into the die 32 by the ram which is operated at a speed of 40 or more strokes per minute under high pressure, such as 400 tons. A single impact stroke of the punch 31 against the slug 30 in the die 32, under high pressure, causes the metal to flow in reverse around the punch 31 in the shape of a cylinder 33 with a closed externally convex bottom 34 as shown in FIG. 5. In the impact extrusion stroke of the punch, the slug 30 is instantaneously impacted between the end wall 35 of the punch and the opposed wall 36 of the die and the metal not retained between said walls 35, 36, flows in reverse around the shank of the punch and instantaneously is extruded into the cylinder 33. The space between the punch wall 35 and die wall 36 is such that the bottom 34 of the container, at the end of the first step of the method, has the radially varying wall thicknesses indicated in FIG. 5, wherein the bottom ranges from .0255 inch at the center to .0275 inch and then to .043 inch in the annular region removed from the center, to .063 inch at the circumferential edge where the bottom merges into the cylindrical walls 33.

The relative dimensions and forms of the punch head and shank in the area indicated at 37 and of the opposed portion 38 of the die 32 provide a space between them for the reverse flow of the metal of the slug 30 which accommodates sufficient metal to form the lower portion 39 of the cylindrical wall 33 of a thickness of .0275 inch immediately above the thicker edge (.063 inch) of the junction of bottom 34 and cylindrical wall 33. The rest of the cylindrical wall 33 above said lower portion 39 is not confined during its extrusion in the first step of the process, but flows freely and instantaneously during the impact stroke in reverse direction along the sides of the punch 31 into the wall formation, increasing gradually from .0195 just above the portion 39 to .0275 inch at the top of the cylinder as shown in FIG. 5.

It will be understood that the entire first step, the impact extrusion step, whereby the cylindrical container of FIG. 5 is produced, is performed by a single stroke of the punch in cooperation with the die and consumes 1½ seconds or less time.

Figure 6:
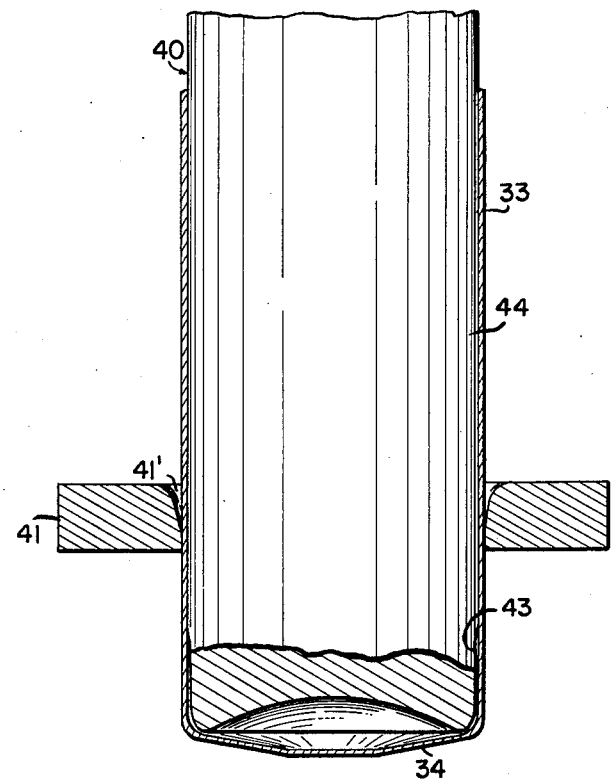
FIG. 6 is a vertical sectional view showing the container of FIG. 5 being drawn through a drawing ring by means of a drawing punch located within the container.
Figure 7:
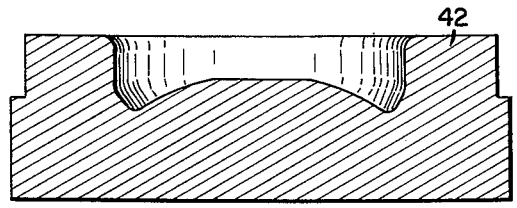
FIG. 7 is a vertical sectional view of the concave bottom forming die.

Referring now to FIGS. 6 and 7, illustrating the second step of the process, the cylinder 33 with bottom 34 is subjected to a combined wall drawing and bottom forming operation by means of a drawing punch 40, drawing ring 41 and bottom forming die 42. By this operation, the exact thickness variation of the container wall is obtained as required for the subsequent necking operation and for maximum pressure resistance with minimum weight of metal in the container.

The thickness variation is obtained by the special profile or varying diameters at specific dimensions of the drawing punch 40, as indicated in this embodiment by the reduced diameter portion 43 of the punch and the greater diameter portion 44 above the reduced part 43. The annular space between the inner surface 41' of the drawing ring 41 and the external surfaces 43, 44 of the punch 40 controls the cylindrical wall thicknesses which are changed in the second step from those indicated in FIG. 5 to the thicknesses indicated in FIG. 9. The punch 40 forces the container toward the die 42 during the drawing operation whereby the bottom 34 is externally concaved and its thicknesses altered from those indicated in FIG. 5 to the thicknesses specified in FIG. 9.

A comparison of FIGS. 5 and 9 shows that during the second step of the method, the diameter of the container is slightly reduced; in this example, from 2.319 to 2.275 inches. The externally convex bottom 34 is changed in the wall-drawing bottom-forming step to the externally concave bottom 45 of FIG. 9. The thickness of the bottom 45 ranges from .0275 inch in the center to .063 inch at the circumferential outer edge 46 and the second step of the operation results in locating the thickest portion 46 radially inwardly of the cylindrical wall 47 of the drawn cylinder (FIG. 9) to a greater degree than the corresponding portion is located inwardly of the cylindrical wall 33 of the cylinder at the end of the first step (FIG. 5).

Figure 8:
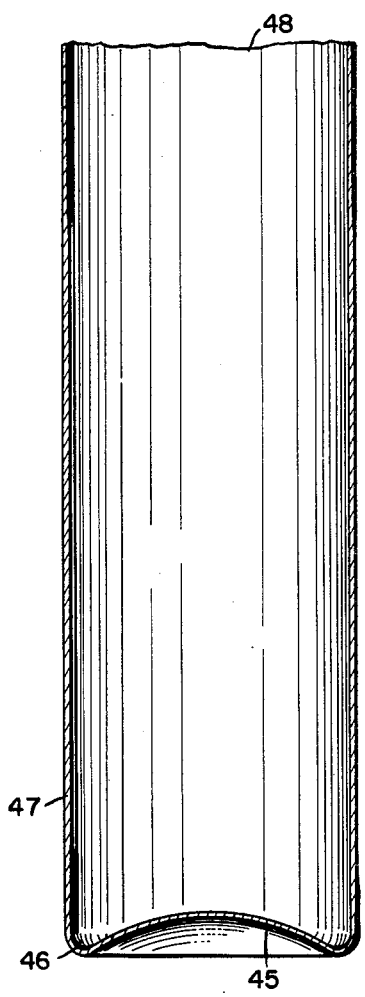
FIG. 8 is a vertical sectional view of the container as it appears at the end of the body drawing and bottom concaving step.

The cylindrical wall 47, FIGS. 8 and 9, is lengthened during the second step slightly in excess of 6.400 inches and the thickness of the wall is reduced throughout the area above the lowermost end which retains the thickness .0275 inch. In FIG. 5 the cylindrical wall above said lowermost end gradually increases in thickness from .0195 at the lower portion to .0275 inch at the top edge, whereas in FIGS. 8 and 9 the cylindrical wall above said lowermost end first gradually decreases in thickness from .019 to .013 inch in the middle area and then gradually increases in thickness from .013 to .023 near the top edge. Thus approximately the upper one-fourth of the cylinder wall 47, adjacent the top edge 48 in FIG. 8 and the trimmed edge 49 (FIG. 9) is from 15 to 80% thicker than the thinnest portion of the cylindrical wall 47 in the middle region of the container, thereby providing the distribution of metal required for efficient necking of the container, while retaining the required thickness in and adjacent the bottom 45, 46 for resisting pressures.

The wall thicknesses and other dimensions shown in FIG. 9 apply also to FIG. 8 excepting that the untrimmed cylinder 47 of FIG. 8 is slightly longer than the 6.40 inches of the cylinder of FIG. 9, wherein the top edge 48 has been trimmed as indicated at 49.

The second, combined drawing and bottom forming step, is followed by a neck and shoulder forming procedure referred to herein as necking of the cylinder which is achieved in a series of steps, preferably twelve, employing necking dies of gradually decreased internal diameters. FIGS. 10 to 21 inclusive show the successive changes produced during twelve necking steps.

Referring to FIG. 10, the cylindrical wall 47 of the inverted container of FIG. 9 has been subjected to the first of the series of necking operations, whereby the neck portion 50 has been produced by exerting pressure in an axial direction on the bottom 45 by a reciprocating necking tool 51 while the inverted neck portion 50 is located in the cavity 52 of a necking die 53 and is confined between the cavity walls of the die 53 and the external walls of a cylindrical mandrel 54 which is slightly smaller in diameter than the diameter of the cylinder 47 of the container. At the end of the first of the series of necking operations the neck portion of the cylindrical walls 47 of the container of FIG. 9 is reduced in diameter to the extent permitted by the size of the mandrel 54 and the contour is altered as permitted by the size and shape of the cavity in the necking die 53 so that the neck contour 50 is produced.

Figure 11:
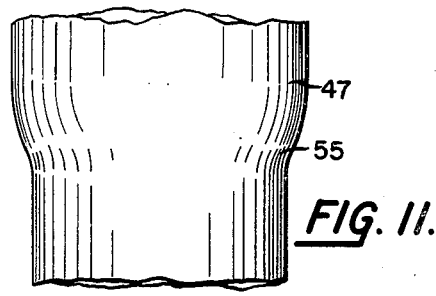
FIGS. 11, 12 and 13 are elevational views of the neck portion of the inverted container, as it appears after having been subjected to successive necking operations in apparatus such as shown in FIG. 10, but employing modified lower necking dies of reduced internal diameters and progressively smaller sizing mandrels for each step.
Figure 12:
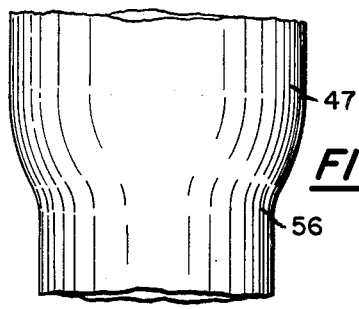
Figure 13:
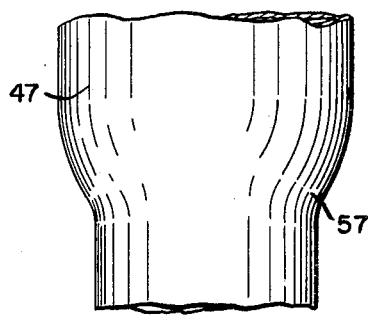
Figure 15:
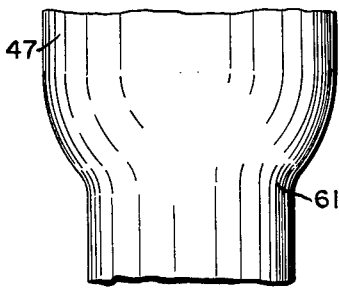
Figure 19:
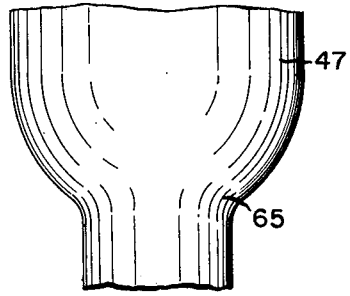
Figure 16:
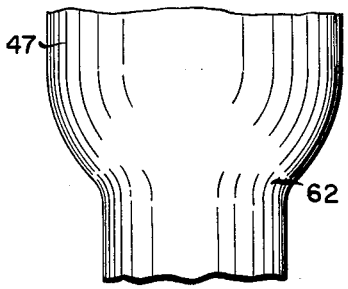
Figure 20:
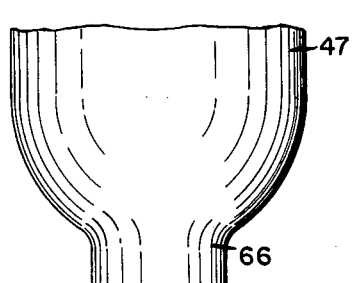
Figure 17:
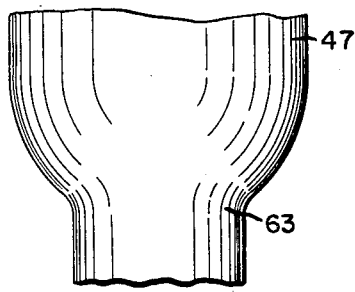

In FIGS. 11, 12 and 13, are shown portions of the cylindrical inverted container body 47 in which the initially necked portion 50 (FIG. 10) has been successively subjected to the action of necking tools whereby said portion 50 has assumed the size and form indicated at 55, 56 and 57, respectively. For this purpose, the pressure exerting tool 51 of FIG. 10 is employed in each successive operation, but a reduced necking die 53 having a smaller cavity than that of FIG. 10 is used in each successive necking operation. The sizing mandrel 54, likewise, is of smaller diameter for each operation, as will be readily understood.

FIG. 14 illustrates the fifth of the series of necking operations. A comparison of the necking die 58 with the die 53 of FIG. 10, and a comparison of the mandrel 59 with the mandrel 54 of FIG. 10 will show the gradual decrease in diameters and form between the first and fifth necking operations, whereby the form of the neck 50 of the container has been changed to that indicated by the neck 60 of FIG. 14. At this stage, the diameter of the neck at its open end has been reduced from 2.275 to approximately 1.55 inches. During the initial necking operations, preferably during the first five of such operations as shown in FIGS. 10 to 14, inclusive, it is desirable to employ mandrels of different and progressively smaller diameters in order to prevent wrinkling and distortion of the walls forming the shoulder and neck portions of the container, but as the necking operations gradually reduce the diameters of the neck and thicken the walls thereof, the use of mandrels may be dispensed with in later necking operations of the series.

In FIGS. 15 to 21, the neck portions 61 to 67, respectively, show the gradual reduction in diameters and the gradual changes in form produced in seven successive necking steps which follow those previously described in connection with FIGS. 10 to 14, inclusive. These changes are achieved by necking tools like those indicated at 51 and 53 in FIG. 10, but the cavities of the dies 53 vary as required to produce the sizes and forms shown in the neck portions 61 to 67, respectively. In the twelve necking steps shown, the size of the neck opening is reduced from approximately 2¼ inches to 1 inch diameter.

It will be understood of course that these figures apply to the 12 ounce container chosen herein for illustrative purposes, and that they will vary for different sized containers, but their proportionate relation to each other indicates the gradual changes preferably achieved in each operation of the necking series, whereby the thin walled cylinder 47 is reduced to desired neck form without distortion or wrinkling of the walls. The number of necking operations in the series is determined by the diameter and shape of the neck so that alteration of the form from cylindrical to final shape is achieved gradually and without too great variation between operations, and wrinkling and crimping is avoided. Preferably less than one-eighth inch reduction in diameter at the neck opening is performed in each necking operation and still less in the shoulder region.

The trimmed containers (FIG. 9) are introduced one after the other into a necking machine provided with the desired number of dies like 53 having varying sized cavities, and are subjected successively to the necking operations of the series and then ejected. By the same movement of the machine, each of the necking operations is made at the same time on a container, so that the number of containers being necked equals the number of necking operations. At each stroke of the machine, a new can is subjected to the first necking operation of the series and another can has been completely necked and is being ejected.

Figure 21:
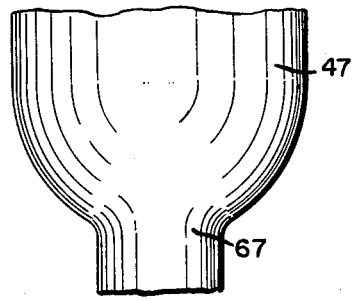
Figure 18:
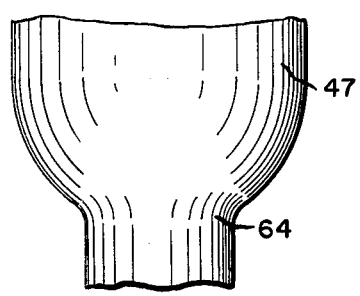

Following the completion of the necking operations, the container of FIG. 21 is subjected to a neck rolling step by means of a roller 68 shown in FIG. 22. The roller 68 has a surface 69 adapted to contact the shoulder 70 of the necked container and a radially projecting axially curved band 71 especially designed to bear against the container at the junction 72 of the neck 67 and shoulder 70. Either the roller or the container may be rotated to bring their surfaces into contact completely around the container for the purpose of smoothing the container surfaces. The roller may be part of a finishing or other machine, as is well understood in the art.

Next the neck 67 is trimmed to finished length, as indicated at 73 in FIGS. 23 and 24. In the latter figure, the neck 67 and shoulder 70 are being polished by a polishing roller 74.

The final step of the method is the curling of the neck to produce the neck 75 shown in FIG. 27, which is done by means of the tool shown in FIGS. 25 and 26. The curling tool 76 has a circular groove 77 whose section profile corresponds to the section profile of the curled neck or rim of the container. A combined rotary and approaching motion is given the tool toward the rim of the container and gently pressed on the rim. The depth of the circular groove 77 is varied as shown in FIG. 26 so that only a few parts of the groove bottom press on the rim during the rotary and pressing motions. This produces a regular and radial pressing curling action of the aluminum of the container without sticking to the tool. Lubrication of the container neck rim is required and for this purpose oil is force fed through the recesses 78 in the curling tool. The cylindrical part 79 of the tool enters the container during the curling operation and sizes the internal diameter of the neck, which must be maintained at very close tolerances to receive the conventional valve closure used in "Aerosol" type containers. No further machining is required on the neck after being curled by this method.

A comparison of FIG. 9, illustrating the 12 ounce can after the drawing and ironing step, and FIG. 27 illustrating the finished can, shows that the length of the container is shortened and part of the walls thickened during the necking and curling operations, and that the wall thickness of the upper necked portion of the finished can increases gradually from the thinnest middle area of the cylinder wall, .013 inch, to .029 inch in the portion adjacent the curled neck.

The relative variations in dimensions and wall thicknesses described and shown in detail herein with respect to a 12 ounce container apply proportionately to other size containers. For example, at the end of the impact extrusion step of making a 6 ounce can, the cylinder length is 3.858 to 4.527 inches and the diameter 1.996 inches, with the following wall thicknesses: bottom .0235 inch at center, gradually radially increasing to .0255, then to .040 inch, to .059 inch at junction between bottom and cylinder; the thinnest part of the cylinder above the bottom being .018 inch gradually increasing to .032 inch near the top. During the drawing-ironing step, this container becomes lengthened and the cylindrical walls are reduced in thickness, the thinnest region being in the middle, .012 inch, gradually increasing to .022 at the upper edge and .017 adjacent the bottom. During the necking and curling operations, the 6 ounce container described is reduced in the finished can to 1.968 inch diameter and 5.039 inches in height, and has the following wall thicknesses: bottom .0235 inch at center increasing radially to .0255, to .040, to .059 inch at annular junction between bottom and cylinder walls, the thinnest part of the cylinder remaining at .012 inch at the middle region adjacent and below the necked portion, increasing gradually in the necked portion to .023 inch at the top and increasing gradually toward the bottom of the cylinder to .017 inch.

Likewise, for example, after the impact extrusion step of making a 3 ounce can, the cylinder length is 2.559 to 2.953 inches, diameter 1.752 inches; with the following wall thicknesses: bottom .020 inch at center, gradually radially increasing to .022 inch, then to .031 inch, to .043 inch at junction between bottom and cylinder; the thinnest part of the cylinder above the bottom being .018 inch, gradually increasing to .026 inch near the top. During the drawing-ironing step, this container has become lengthened and the cylindrical walls have been reduced in thickness, the thinnest region being in the middle, .0105 inch, gradually increasing to .020 at the upper edge and .012 inch adjacent the bottom. During the necking and curling operations, the 3 ounce container described is reduced in the finished can to 1.732 inch in diameter and 3.130 inches in height, and has the following wall thicknesses: bottom .020 inch at center increasing radially to .022, to .031, to .043 inch at annular junction between bottom and cylinder walls, the thinnest part of the cylinder being .0105 inch at the middle region adjacent and below the necked portion, increasing gradually in the necked portion to .021 at the top and increasing gradually toward the bottom of the cylinder to .012 inch.

The dimensions and wall thicknesses set forth herein with respect to the 3, 6 and 12 ounce containers, show that they have certain similar features which characterize them as extremely light, thin walled containers, with bottom walls thinnest at the center, increasing to double or more thickness at the junction of bottom and cylindrical walls; all have extremely thin middle regions in the cylindrical walls adjacent and below the necked portion, increasing gradually to the top of the necked portion and to the lower end adjacent the bottom junction.

As heretofore pointed out, in the finished 12 ounce container, the very thin middle region of the cylinder is .013 inch, increasing to .029 at the top and .0275 near the bottom; in the finished 6 ounce container, the very thin middle region of the cylinder is .012 inch, increasing to .023 at the top and .017 near the bottom; and in the finished 3 ounce container, the very thin middle region of the cylinder is .0105 inch, increasing to .021 at the top and .012 near the bottom. Likewise, in the finished 12 ounce container, the very thin middle region of the bottom is .0275 inch, radially increasing to .063 inch at the junction of bottom and cylinder; in the finished 6 ounce container, the very thin middle region of the bottom is .0235 inch, radially increasing to .059 inch at the junction of bottom and cylinder; and in the finished 3 ounce container, the very thin middle region of the bottom is .020 inch, gradually increasing to .043 inch at the junction of bottom and cylinder.

The method described is not only economical in operation, but results in producing exceedingly light containers having extraordinary strength. For example, the 12 ounce container described herein weighs only 40 grams or less than one and one-half ounces.

In describing the invention, reference has been made to a particular example embodying the same, but I wish it to be understood that the invention is not limited to the exact form of container shown, and that changes may be made in the specific embodiment without departing from the invention. Likewise, the method may be modified with respect to the number of necking operations in the series, and in other details, as herein explained.

Further, as previously stated, the invention is not restricted to containers made of aluminum, although I have chosen to describe the preferred embodiment as an aluminum container. Extrusile metals such as aluminum, aluminum alloys may be employed, the choice being determined by the nature of the proposed container contents as well as the cost of the metal. At present aluminum is the choice for most practical purposes.

I claim:
1. The method of manufacturing a one piece very thin walled closed bottom container from a slug of metal, comprising supporting the slug on a concave-surfaced die and subjecting the slug while thus supported to a single impact-extrusion stroke of a punch under high pressure and thereby instantly simultaneously forming a container having a cylindrical wall and an externally convex bottom thinnest at its center and thickest at its junction with the cylinder wall, supporting the container at its externally convex bottom on a convex-surfaced die and drawing the cylinder wall in a single drawing step between a ring and a drawing punch while the container is thus supported at its bottom and thereby simultaneously reducing the thickness of the cylinder wall, lengthening the cylinder, forcing the externally convex bottom inwardly, converting it to externally concave shape and thickening said bottom in its central portion by a single stroke of said drawing punch, and trimming the upper edge of the cylinder wall.

2. The method defined by claim 1, followed by a shoulder and neck forming operation which consists in inverting the container, supporting the open end of the container in the cavity of a shoulder and neck forming die, applying pressure externally axially against the concave bottom of the inverted container and thereby simultaneously reducing the axial length of the cylindrical walls and thickening the portion forming the shoulder and neck, and repeating said operation while the cylinder portion is supported in the cavity of another shoulder and neck forming die smaller in diameter than the preceding die until the shoulder and neck have been reduced gradually to predetermined diameters.

3. The method defined by claim 1, in which the step of simultaneously drawing the cylinder and converting the initial convex bottom to externally concave shape includes slightly diminishing the diameter of the cylinder wall and relocating the junction between the bottom and cylinder slightly inwardly of the cylinder wall.

4. A method of manufacturing a one piece very thin walled closed bottom container from a slug of metal, comprising a first step of subjecting the slug while supported on a concave-surfaced die to a single impact-extrusion stroke of a punch under high pressure and thereby instantly simultaneously forming a container having a cylindrical wall and an initial externally convex bottom thinnest at its center and gradually increasing in thickness radially outwardly and joined to the cylinder wall by a relatively thick annular junction, a second step of drawing the cylinder wall between a ring and a drawing punch while the bottom of the container is supported on a convex-surfaced die to thereby simultaneously reduce the thickness of the cylinder wall between its lower and upper end portions, to lengthen the cylinder, to force the convex bottom upwardly by pressure of said bottom against the die, to convert said bottom to externally concave shape thicker at its center than said initially formed bottom, and to relocate the junction between the bottom and cylinder slightly inwardly of the said cylinder walls by a single stroke of said drawing punch, trimming the upper edge of the cylinder wall, and subjecting the container to a shoulder and neck forming operation which consists of inverting the container, placing a mandrel in its open end, supporting said end in the cavity of a shoulder forming and necking die, applying pressure axially against the concave bottom of the container while the open end is thus supported, and repeating said operation first with and then without inserting a mandrel while the said open end is supported in a die having a cavity of smaller diameter than the preceding die until the shoulder and neck have been reduced gradually to predetermined diameters, said axial pressure against the container bottom while the open end portion of the cylinder is thus supported simultaneously reducing the axial length of the container and thickening the wall portion while forming and reducing the diameters of said shoulder and neck.

5. The method defined by claim 4, followed by curling the neck by bearing against circumferentially spaced apart portions of the metal surrounding the top opening until the entire edge has been curled.

References Cited in the file of this patent

UNITED STATES PATENTS

| | | |
|---|---|---|
| 1,295,430 | Carlson | Feb. 25, 1919 |
| 1,318,860 | Fries et al. | Oct. 14, 1919 |
| 1,948,437 | Bowers | Feb. 20, 1934 |
| 2,372,800 | Stearns | Apr. 3, 1945 |
| 2,387,698 | Yost | Oct. 23, 1945 |
| 2,483,376 | Temple | Sept. 27, 1949 |
| 2,541,065 | Jabour | Feb. 13, 1951 |
| 2,679,816 | Moore | June 1, 1954 |
| 2,762,108 | Friedman | Sept. 11, 1956 |
| 2,776,475 | Mapes | Jan. 8, 1957 |
| 2,856,102 | Remington et al. | Oct. 14, 1958 |